(12) United States Patent
Ferroussat

(10) Patent No.: US 7,096,246 B2
(45) Date of Patent: Aug. 22, 2006

(54) ARITHMETIC UNIT FOR MULTIPLYING A FIRST QUANTITY X BY A SECOND QUANTITY Y

(75) Inventor: Sebastien Ferroussat, Fontaine (FR)

(73) Assignee: STMicroelectronics S.A., Gentilly (FR)

( * ) Notice: Subject to any disclaimer, the term of this patent is extended or adjusted under 35 U.S.C. 154(b) by 650 days.

(21) Appl. No.: 09/919,496

(22) Filed: Jul. 30, 2001

(65) Prior Publication Data

US 2002/0042805 A1    Apr. 11, 2002

(30) Foreign Application Priority Data

Aug. 1, 2000 (EP) ................. 004100920

(51) Int. Cl.
*G06F 7/52* (2006.01)

(52) U.S. Cl. ..................... 708/628

(58) Field of Classification Search ......... 708/627–628
See application file for complete search history.

(56) References Cited

U.S. PATENT DOCUMENTS 4,813,008 A * 3/1989 Shigehara et al. .......... 708/630

5,751,618 A * 5/1998 Abiko et al. ............... 708/490
6,157,939 A * 12/2000 Vo et al. .................... 708/628
6,463,453 B1 * 10/2002 Dang ......................... 708/628

FOREIGN PATENT DOCUMENTS

| EP | 0 497 622 A | 8/1992 |
| EP | 0 813 143 A | 12/1997 |
| WO | WO 85 05705 A | 12/1985 |

OTHER PUBLICATIONS

European Search Report from corresponding European Application No. 00410090 filed Aug. 1, 2000.

* cited by examiner

*Primary Examiner*—Tan V. Mai
(74) *Attorney, Agent, or Firm*—Lisa K. Jorgenson; James H. Morris; Wolf, Greenfield & Sacks, P.C.

(57) ABSTRACT

An arithmetic unit for multiplying a first quantity x by a second quantity y, the arithmetic unit including a Booth coder having a plurality of inputs for receiving a plurality bits of the second quantity and a plurality of outputs for providing Booth coded outputs; and circuitry connected to at least one of the inputs and the outputs for modifying at least one output of the coder.

21 Claims, 7 Drawing Sheets

ARITHMETIC UNIT FOR MULTIPLYING A FIRST QUANTITY X BY A SECOND QUANTITY Y

FIELD OF THE INVENTION

The present invention relates to an arithmetic unit and in particular but not exclusively to an arithmetic unit for use in a digital signal processor.

BACKGROUND TO THE INVENTION

In known arithmetic units, it is possible to calculate a multiply accumulate function. In a multiply accumulate function, a first number X is multiplied by a second number Y and added to an accumulator ACCU. This function may be repeated a number of times to modify each time the value of the accumulator ACCU. In mathematical notation, the result RES of this function can be represented as follows:

$$RES=ACCU+X*Y$$

In the next operation which is performed, ACCU will equal the result RES obtained by carrying out the preceding function.

Figure 1:
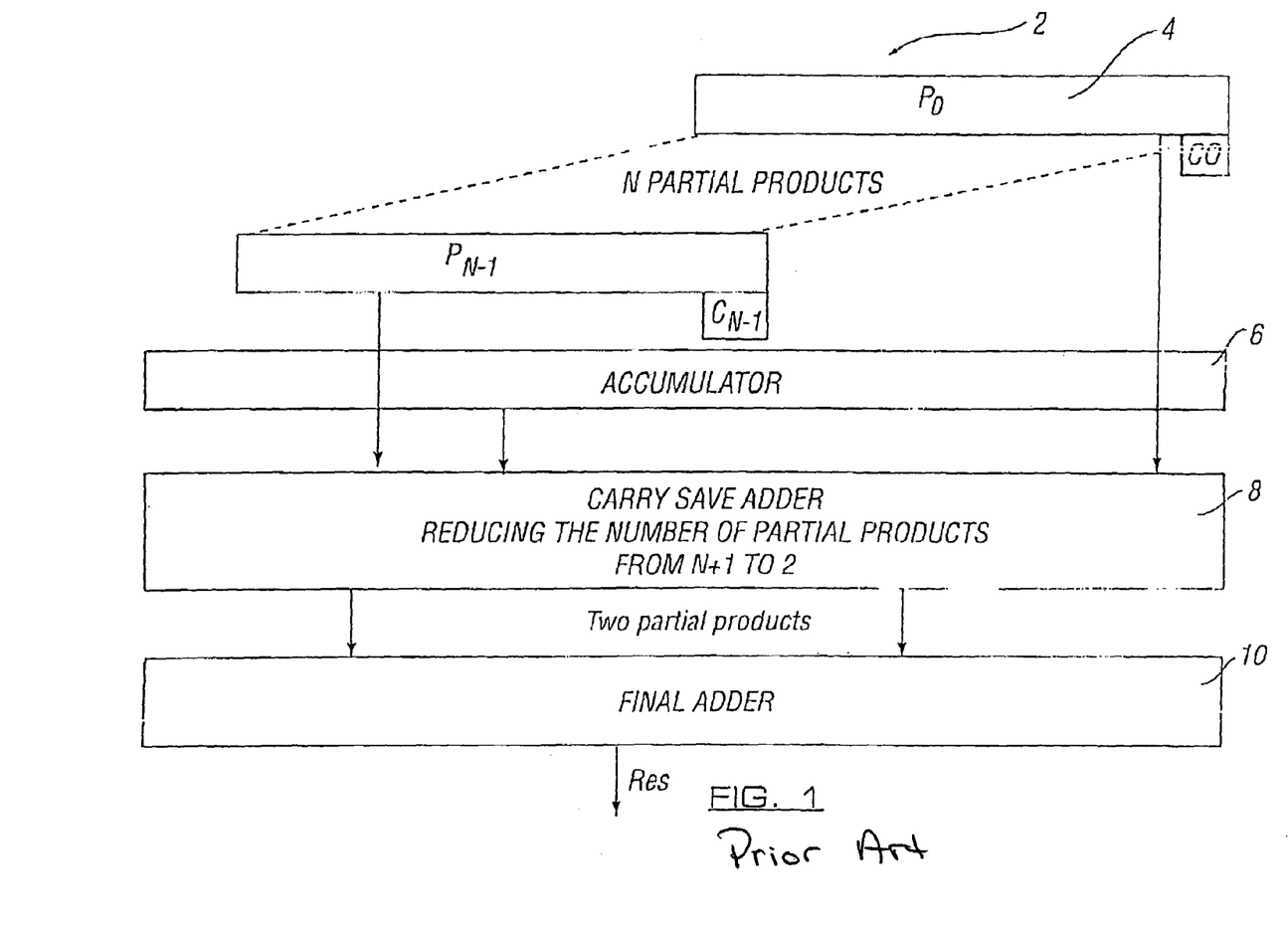
FIG. 1 shows a block diagram of a known arithmetic unit which is arranged to perform a multiply accumulate function.

Reference is made to FIG. 1 which shows a known arithmetic unit 2 which performs a multiply accumulate function. The unit 2 generates n partial products 4. The current accumulator ACCU is stored in the accumulator register 6. The partial products 4 along with the output from the accumulator register 6 are input to a carry save adder 8. The carry save adder 8 reduces the number of partial products and the output of the accumulator register 6 to two partial products. In other words, the N+1 inputs to the carry save adder 8 are reduced to two. These two partial products are output to a final adder 10 which adds together the two partial products to provide the final result RES.

In the arrangement shown in FIG. 1, it is possible to perform a carry save operation in the carry save adder 8 on the partial products and the contents of the accumulator register 6 at the same time. X*Y is equal to the sum of all of the partial products P0 to P(n−1). In other words X*Y=ΣPi for i=0, 1 . . . n−1. Thus, RES=ACCU+ΣPi. As shown by this equation, all the partial products and the accumulator ACCU are added together in order to obtain the result RES.

It is also desirable in certain circumstances to be able to perform a multiply subtract operation. In this operation, a first number X is multiplied by a second number Y and subtracted from a accumulator ACCU (which in fact may be modified by subsequent operations) to provide the result RES. In mathematical notation, RES=ACCU−X*Y. Again, X*Y can be determined by adding together the n partial products. Accordingly, RES=ACCU−ΣPi. The architecture shown in FIG. 1 is not suitable for use with a multiply subtract operation. This is because the partial products and accumulator ACCU cannot simply be added together to provide the result RES. Some additional circuitry will therefore be required in order to allow a multiply subtract operation to be performed as well as a multiply accumulate function. This additional circuitry would inevitably result in an increase in the time taken to complete an operation.

SUMMARY OF THE INVENTION

It is therefore an aim of embodiments of the present invention to provide an arithmetic unit which avoids or at least mitigates the difficulties of the above discussed arrangement.

According to one aspect of the present invention there is provided an arithmetic unit for multiplying a first quantity X by a second quantity Y, said arithmetic unit comprising:

a Booth coder having a plurality of inputs for receiving a plurality bits of the second quantity and a plurality of outputs for providing Booth coded outputs; and circuitry means connected to at least one of said inputs and said outputs for modifying at least one output of the coder.

The circuitry may comprise a logic gate, for example an exclusive OR gate.

The Booth coder may be arranged to provide a CX, C2X and SGN output. The SGN output may be connected to the circuitry. When said value is to be subtracted from ACCU, the exclusive OR gate may receive a signal with the value "1" and the SGN output. The output of the exclusive OR gate would then provide the modified SGN output. If the value is to be added to ACCU, then the exclusive OR gate would receive a signal with the value "0" as well as the SGN output.

The circuitry may alternatively comprise at least one multiplexer. The Booth coder may be arranged to provide an SNGL output, a NZP output and a NZN output. The NZP and NZN outputs may be connected to the circuitry. The NZP output may be connected to a first and a second multiplexer and the NZN output may also be connected to the first and second multiplexers. When a partial product is to be generated, the first multiplexer provides the NZP output and the second multiplexer provides the NZN output. When a partial product of the opposite sign is to be generated, the first multiplexer provides the NZN output and the second multiplexer provides the NZP output. Thus, in a simple way an accumulate and a subtract function can be performed using very little additional circuitry.

The second quantity may be an xN bit operand where x is an integer and N bits are used for multiplication with the first quantity, N/2 Booth coders may be provided and the circuitry may be connected to the outputs of said N/2 Booth coders. x may be equal to 2 and the N most significant bits or the N least significant bits are used in the multiplication and the circuitry receives at least one control signal to control the selection of the N bits. Booth coding may permit the number of partial products to be reduced by 2.

Three multiplexers may be provided, the first and second multiplexers each receiving the NZP and NZN outputs of the first and second Booth coders and the third multiplexer receiving the SNGL outputs of the first and second Booth coders. In this type of arrangement, multiplexers are in any event required in order to select the most significant bits or the least significant bits. Accordingly, the use of the multiplexers to provide outputs in accordance with whether or not the partial product or the partial product of the opposites sign is required does not necessarily increase the time taken to complete an operation.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF EMBODIMENTS OF THE INVENTION

Embodiments of the present invention are arranged to be able to carry out multiply accumulate and multiply subtract functions. In the multiply subtract function, −Pi is used instead of Pi. Pi can be positive or negative. If Pi is positive, then −Pi will be negative and vice versa. In other words, the opposite value of each partial product is generated. These opposite partial products −Pi can then be added together with the accumulated total ACCU as in the arrangement shown in FIG. 1 for the multiply accumulate function.

In a preferred embodiment of the present invention, −Pi is generated by using a modified form of Booth coding. Booth coding is a well known algorithm which is sometimes referred to as the Booth-MacSorley algorithm, It will be referred to simply as the Booth algorithm in this document. The Booth algorithm is used to recode the multiplier (i.e. Y) such that the number of partial products is roughly reduced by a factor of 2. The multiplier, i.e. Y is divided into groups of three bits, each group comprising the 2i+1, the 2i and 2i−1 bits of the Y multiplier. Depending on the values of the bits of each group, the value of the number to be multiplied by Y, i.e. X is modified to generate one of five partial products: −2X, −X, 0, X, 2X.

Reference is made to the following table, table 1, which shows the partial products for all the possible values of the group of three bits of the multiplier Y.

This Booth coding can be used in two different ways. In one form of coding referred to as SNGL-NZP-NZN coding, the carry is NZN. A first output SNGL will have the value "1" when the partial product is +X or −X. The remaining values will be "0". NZP is the "non zero positive" value and has the value "1" when the partial product is X or 2X. At other times, the value will be "0". NZN is the "non zero negative" value and has the value "1" if the partial product is −X or −2X. At other times the value will be "0".

In the other form of coding referred to as CX-C2X-SGN, the carry signal is SGN. CX will have the value "1" when the partial product is X or −X and at other times the value will be "0". C2X will have the value "1" when the partial product is equal to +2X or −2X and at other times the value will be "0". SGN will have the value "1" if the partial product is −X or −2X and in one of the 2 cases where the partial product if 0 (when the 3 input bits are all equal to "1"). In other cases, its value is "0".

In both of the Booth coding examples discussed hereinbefore, 2's, complement arithmetic is used.

Figure 2:
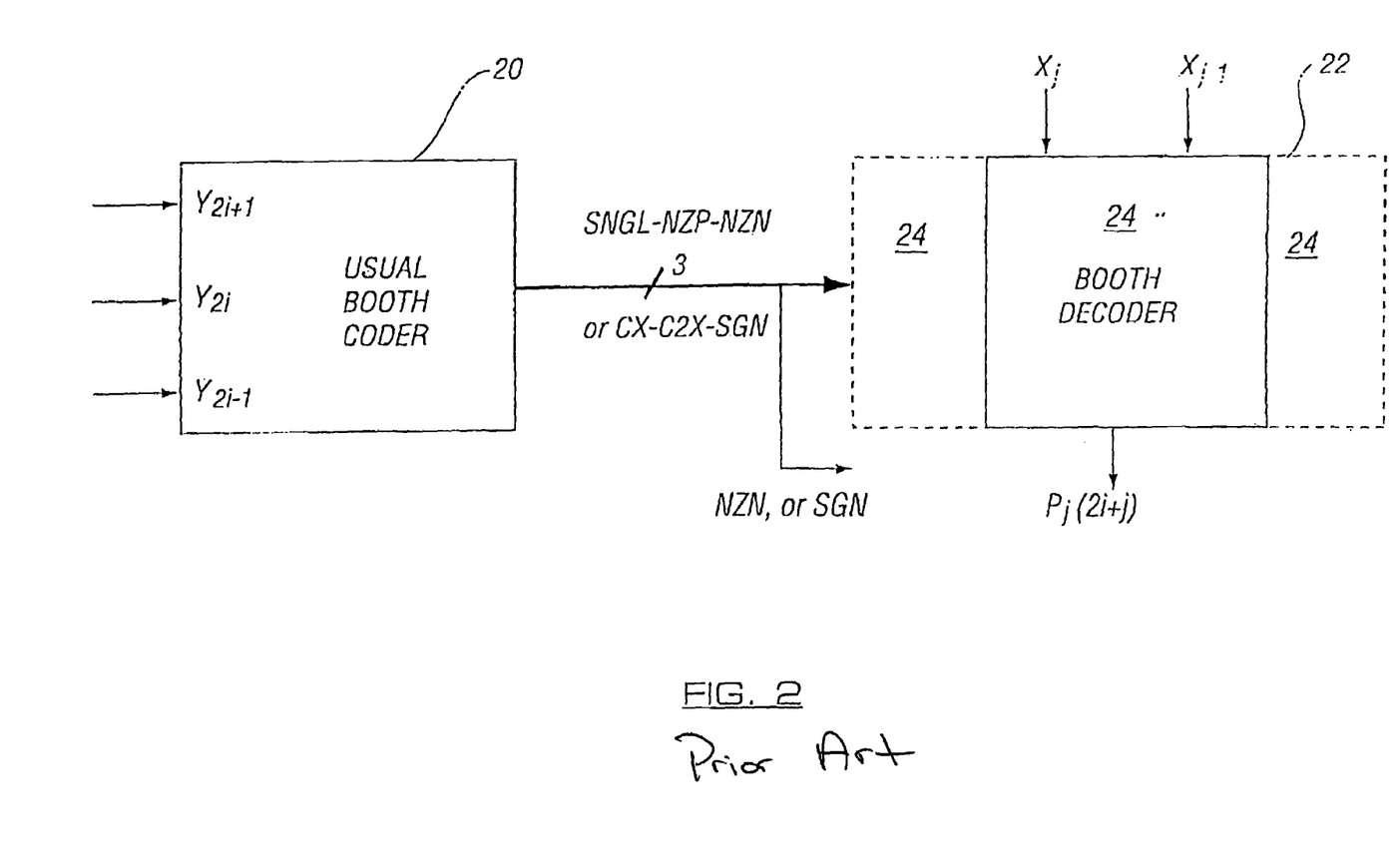
FIG. 2 shows a block diagram illustrating how Booth coding works.

Reference will now be made to FIG. 2 which illustrates how Booth coding works in practice.

The three bits of the multiplier Y2i+1, Y2i and Y2i−1 are input to a Booth coder. In practice a number of Booth coders are provided. In dependence of the value of the individual bits of the multiplier Y input into the Booth coder 20, an output of three bits is provided. The output provided by the Booth coder 20 will depend also on the form of coding as discussed hereinbefore.

The three bits which are output by the Booth coder are input to a Booth decoder 22. The Booth decoder 22 comprises a plurality of Booth decoder units 24. The number of Booth decoder units 24 is roughly equal to the number of bits in the multiplicand. Each Booth decoder unit 24 receives an input from two bits of the multiplicand, XJ and XJ−1. Each Booth decoder unit 24 provides a partial product output. The carry bit is provided by the NZN or SGN bits depending on the type of Booth coding used.

In embodiments of the present invention, −P is obtained by carrying out the following operation: −P=Y* (−Y). In 2's compliment arithmetic, −Y=$\overline{Y}$+1 where $\overline{Y}$ is the compliment of Y. Accordingly, in the Booth coder, instead of Y2i+1, Y2i and Y2i−1, the following need to be considered:

$\overline{Y2i+1}$, $\overline{Y2i}$, $\overline{Y2i-1}$

The carry i.e. +1 can be dealt with separately.

Reference is made to the modified Booth encoding provided by embodiments of the present invention. First of all, the modification required to the SNGL-NZP-NZN coding will first be discussed. Reference is made to table 2.

| | | | | Coding SNGL-NZP-NZN The carry is NZN | | | Coding CX-C2X-SGN The carry is SGN | | |
|---|---|---|---|---|---|---|---|---|---|
| Y2i + 1 | Y2i | Y2i − 1 | Partial Product | SNGL | NZP | NZN | CX | C2X | SGN |
| 0 | 0 | 0 | 0 | 0 | 0 | 0 | 0 | 0 | 0 |
| 0 | 0 | 1 | X | 1 | 1 | 0 | 1 | 0 | 0 |
| 0 | 1 | 0 | X | 1 | 1 | 0 | 1 | 0 | 0 |
| 0 | 1 | 1 | 2X | 0 | 1 | 0 | 0 | 1 | 0 |
| 1 | 0 | 0 | −2X | 0 | 0 | 1 | 0 | 1 | 1 |
| 1 | 0 | 1 | −X | 1 | 0 | 1 | 1 | 0 | 1 |
| 1 | 1 | 0 | −X | 1 | 0 | 1 | 1 | 0 | 1 |
| 1 | 1 | 1 | 0 | 0 | 0 | 0 | 0 | 0 | 1 |

| Y2i+1 | Y2i | Y2i-1 | Negative Product MUL_SUB | Parital Product | SNGL' | NZP' | NZN' |
|---|---|---|---|---|---|---|---|
| 0 | 0 | 0 | 0 | 0 | 0 | 0 | 0 |
| 0 | 0 | 1 | 0 | X | 1 | 1 | 0 |
| 0 | 1 | 0 | 0 | X | 1 | 1 | 0 |
| 0 | 1 | 1 | 0 | 2X | 0 | 1 | 0 |
| 1 | 0 | 0 | 0 | -2X | 0 | 0 | 1 |
| 1 | 0 | 1 | 0 | -X | 1 | 0 | 1 |
| 1 | 1 | 0 | 0 | -X | 1 | 0 | 1 |
| 1 | 1 | 1 | 0 | 0 | 0 | 0 | 0 |
| 0 | 0 | 0 | 1 | 0 | 0 | 0 | 0 |
| 0 | 0 | 1 | 1 | -X | 1 | 0 | 1 |
| 0 | 1 | 0 | 1 | -X | 1 | 0 | 1 |
| 0 | 1 | 1 | 1 | -2X | 0 | 0 | 1 |
| 1 | 0 | 0 | 1 | 2X | 0 | 1 | 0 |
| 1 | 0 | 1 | 1 | X | 1 | 1 | 0 |
| 1 | 1 | 0 | 1 | X | 1 | 1 | 0 |
| 1 | 1 | 1 | 1 | 0 | 0 | 0 | 0 |

The first three columns represent the possible values of three bits of the multiplier i.e. Y. The fourth column represents whether or not a multiply accumulate or a multiply subtract operation is to be carried out. If a multiply accumulate function is to be carried out, then P is calculated by the multiplier and MUL_SUB is equal to "0". For a multiply subtract function, -P is calculated and MUL_SUB is equal to "1". The value of MUL_SUB thus indicates if a multiply accumulate or a multiply subtract operation is to be performed. The first half of the table is thus the same as table 1 and represents the Booth coding values for the multiply accumulate function whilst the second part of the table represents the values for the multiply subtract function. In a multiply subtract function, the partial product will have the opposite sign to the partial product for a multiply accumulate function for the same values of the group of three bits of the multiplier Y.

From a comparison of the first half of the table it can be seen that for given values of the three bits of the multiplier Y, the output SNGL' is unaffected by whether or not a multiply accumulate or subtract function is to be performed. It can also be seen that for given values of the three bits of the multiplier Y, NZP' for a multiply accumulate function equals NZN' for a multiply subtract function. Likewise, for given values of the three bits of the multiplier Y, NZN' for a multiply accumulate function equals NZP' of the multiply subtract function.

Figure 3:
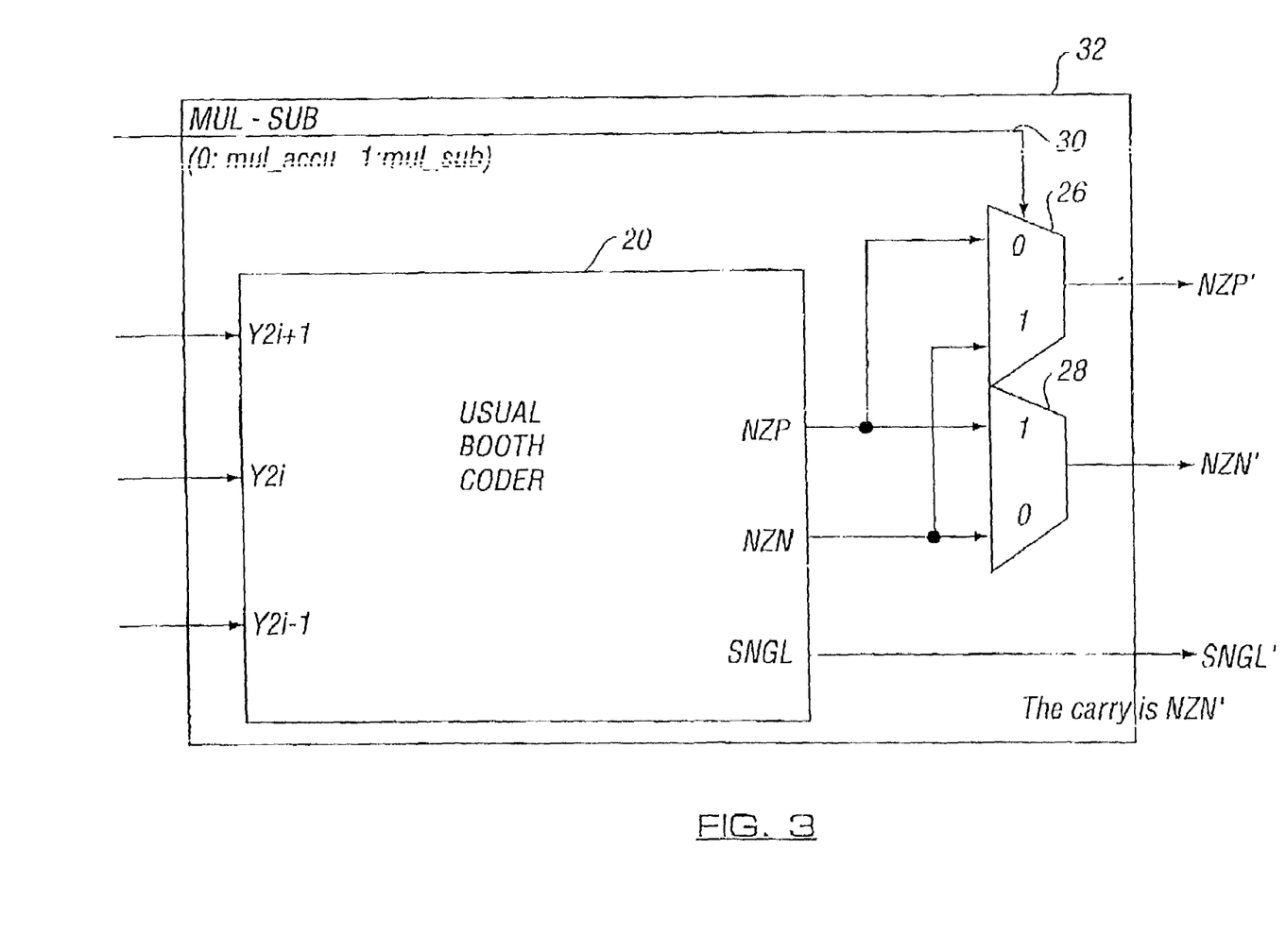
FIG. 3 shows a block diagram of a modified Booth coder embodying the present invention.

Reference is made to FIG. 3 which shows a Booth coder 32 embodying the present invention. The Booth coder 32 embodying the present invention comprises a conventional Booth coder 20 as shown in FIG. 2. However, the NZP output is provided to first and second multiplexers 26 and 28 respectively. Likewise, the NZN output is also provided to the first and second multiplexers 26 and 28. The first and second multiplexers 26 and 28 each receive a control signal 30 which has the value "0" if a multiply accumulate function is to be performed and the value "1" if a multiply subtract function is to be performed. The output of the first multiplexer 26 provides the NZP' output whilst the output of the second multiplexer 28 provides the NZN' output.

In the multiply accumulate mode of operation, the control signal 30 will have the value "0" and the NZP output from the conventional Booth coder 20 will be provided as the output of the first multiplexer 26 to provide the signal NZP'. Likewise, the output NZN from the conventional Booth coder 20 will be selected as the output of the second multiplexer 28 to provide the output NZN'.

In the multiply subtract mode of operation, the control signal 30 will have the value "1". This will cause the NZN output from the conventional Booth coder 20 to be selected as the output of the first multiplexer 26 to provide the output NZP'. Likewise, the output NZP of the conventional Booth coder 20 will be selected as the output of the second multiplexer 28 to provide the NZN' output.

As the signal SNGL is the same for both multiply accumulate and multiply subtract functions, no alternation is required to that output in the different modes of operation. In both types of multiply operation, the carry signal will be NZN'. The output of the modified Booth coder 32 will be used as in conventional Booth decoder shown in FIG. 2.

Figure 4:
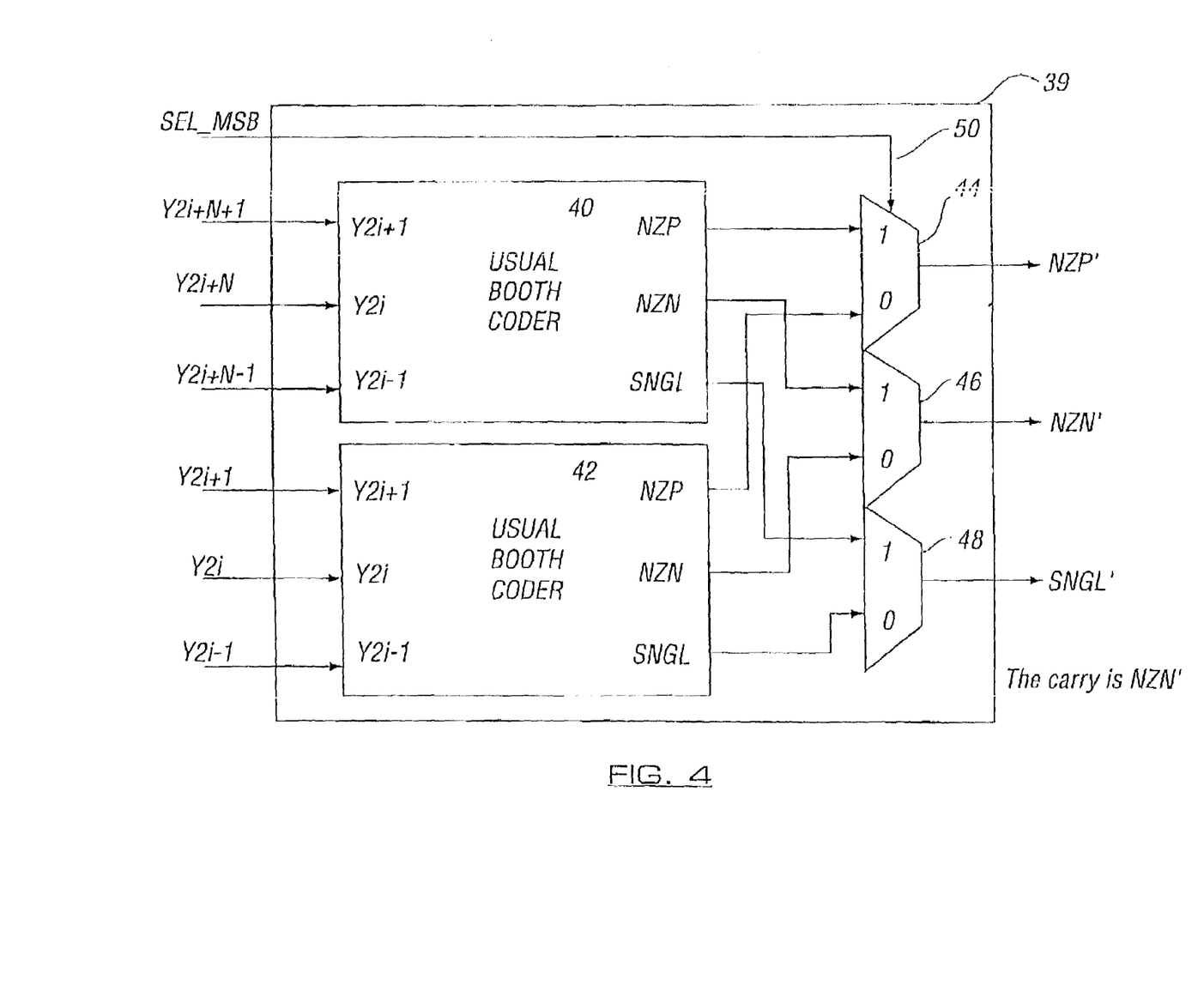
FIG. 4 shows a block diagram of an arrangement incorporating conventional Booth coding, with a selection between the most significant bits and the least significant bits.

Reference is made to FIG. 4 which shows a Booth coder unit 39 using conventional Booth coding. The multiplier Y is a 2N bit operand but only the N least significant bits or the N most significant bits are used for the multiplication.

This arrangement comprises first and second Booth coders 40 and 42. These Booth coders 40 and 42 are conventional and for example are as shown in FIG. 2. The first Booth coder 40 receives the most significant bits and the inputs to the first Booth coder 40 are thus Y2i+N+1, Y2i+N and Y2i+N-1. The second Booth coder 42 receives the least significant bits and accordingly receives the inputs Y2i-1, Y2i and Y2i-1.

In accordance with the normal Booth coding principles, the signals NZP, NZN and SNGL are generated by the first and second Booth coders 40 and 42. The outputs of the first and second Booth coders 40 and 42 are output to first, second and third multiplexers 44, 46 and 48 respectively. The first multiplexer 44 receives the NZP signal from both the first and the second Booth coders 40 and 42. The second multiplexer 46 receives the NZN signal from both the first and the second Booth coders 40 and 42 and the third multiplexer 48 receives the SNGL signal from the first and second Booth coders 40 and 42. The multiplexers 44, 46 and 48 receive a control signal 50. If the control signal 50 has the value "1", then the most significant bits are to be used in the multiplication. If, on the other hand, the control signal 50 has the value zero, then the least significant bits are to be used for the multiplication.

Thus, if the control signal 50 has the value "1", the outputs from the first Booth coder 40 are output from the first to third multiplexers 44 to 48 respectively. If, on the other hand, the least significant bits are to be used for the multiplication and the control signal 50 has the value "0", then the NZP, NZN and SNGL outputs from the second Booth coder 42 will be output by the first to third multiplexers 44 to 48 respectively.

Figure 5:
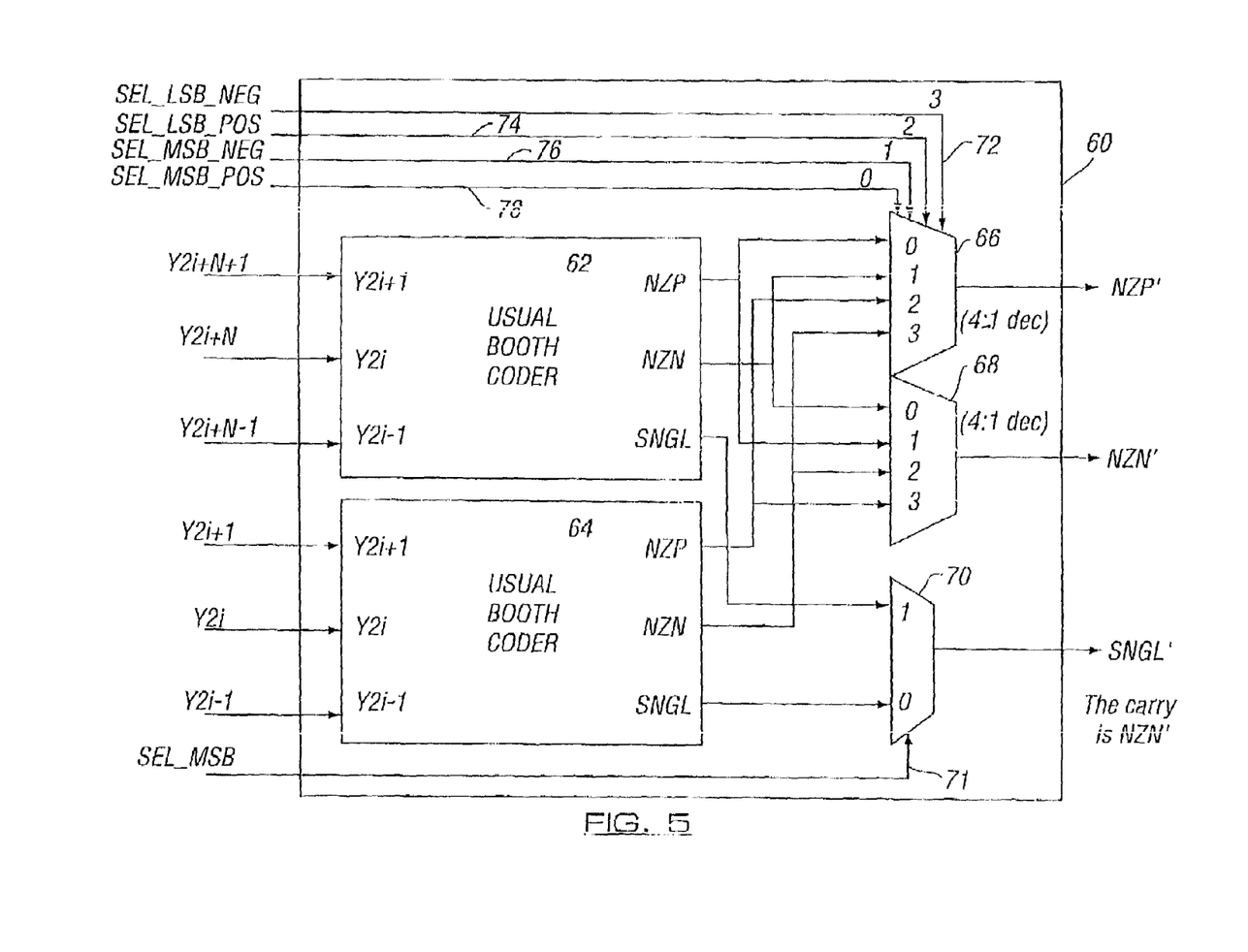
FIG. 5 shows a block diagram incorporating Booth coding which embodies the present invention, with a selection between the most significant bits and the least significant bits.

Reference is made to FIG. 5 which shows how embodiments of the present invention can be used in an arrangement such as shown in FIG. 4. The Booth coder unit 60 embodying the present invention comprises first and second Booth coders 62 and 64. The first and second Booth coders 62 and 64 are conventional. The first Booth coder 62 receives the most significant bits and therefore the inputs are Y2i+N+1, Y2i+N and Y2i+N-1. The second Booth coder 64 receives the least significant bits and therefore receives the inputs Y2i+1, Y2i and Y2i-1. The first and second Booth coders 62 and 64 each generate the conventional NZP, NZN and SNGL signals as discussed hereinbefore.

The Booth coder unit 60 embodying the present invention has first to third multiplexers 66, 68 and 70. The first multiplexer 66 receives inputs from the NZP and NZN outputs of both the first and second Booth coders 62 and 64. In other words, the first multiplexer 66 receives four inputs.

The second multiplexer 68 receives the same inputs as the first multiplexer 66 and therefore receives the NZP and NZN outputs from both the first and second Booth coders 62 and 64. The first and second multiplexers 66 and 68 each receive four control signals 72 to 78. The first control signal 72 indicates whether a subtract function is to take place using the least significant bits. The second control signal 74 indicates whether a accumulate function is to be carried out with the least significant bits. The third control signal 76 indicates whether a subtract function is to be carried out with the most significant bits whilst the fourth control signal 78 indicates if an accumulate function is to be carried out with the most significant bits. Accordingly, one of these signals will have the value "1" whilst the rest of the signals will have the value "0".

If the first control signal 72 has the value "1", then the NZN output of the second Booth coder 64 will provide the output of the first multiplexer 66 which will be the NZP' output. If the value of the second control signal 74 is "1", then the output provided by the first multiplexer 66 will be the NZP signal from the second Booth coder 64. If the third control signal 76 has the value "1", the NZN output of the first Booth coder 62 will be output by the first multiplexer 66 to provide the NZP' output. Finally, if the fourth control signal 78 has the value "1", the output of the first multiplexer 66 will be the NZP output of the first Booth coder 62.

These same control signals also control the output of the second multiplexer 68 which provides the NZN' output. If the value of the first control signal 72 is "1", then the output of the second multiplexer 68 will be the NZP output of the second Booth coder 64. If the value of the second control signal 74 is "1" then the output of the second multiplexer 68 will be the NZN output of the second Booth coder 64. If the value of the third control signal 76 is "1", then the output of the second multiplexer 68 will be the NZP output of the first Booth coder 62. Finally, if the value of the fourth control signal 78 is "1", then the output of the second multiplexer 68 will be the NZN output of the first Booth coder 62.

The third multiplexer 70 receives the SNGL signals from the first and second Booth coders 62 and 64. The third multiplexer 70 receives a control signal 71 which selects the output from the first Booth coder 62 if the most significant bits are to be used in the multiplication and the output of the second Booth coder 64 if the least significant bits are to be used in the multiplication.

In this embodiment, no additional time is required in order to carry out the multiply subtract function. This embodiment includes the selection between the most significant and the least significant part of the Y data, and it requires 2 to 1 multiplexers as shown in FIG. 4. This embodiments also includes the multiply subtract feature, which only requires that the 2 to 1 multiplexers be changed to 1-hot 4 to 1 multiplexers. A 1-hot 4 to 1 multiplexer has 1 control signal for each input data. The 1-hot 4 to 1 multiplexers have the same timing as the 2 to 1 multiplexers and therefore do not increase the timing.

Reference is now made to table 3 which shows how the CX-C2X-SGN coding can be modified so as to be used in subtract and accumulate functions.

| Y2i + 1 | Y2i | Y2i − 1 | MUL_SUB (−P) | Partial Product | CX' | C2X' | SGN' |
|---|---|---|---|---|---|---|---|
| 0 | 0 | 0 | 0 | 0 | 0 | 0 | 0 |
| 0 | 0 | 1 | 0 | X | 1 | 0 | 0 |
| 0 | 1 | 0 | 0 | X | 1 | 0 | 0 |
| 0 | 1 | 1 | 0 | 2X | 0 | 1 | 0 |
| 1 | 0 | 0 | 0 | −2X | 0 | 1 | 1 |
| 1 | 0 | 1 | 0 | −X | 1 | 0 | 1 |
| 1 | 1 | 0 | 0 | −X | 1 | 0 | 1 |
| 1 | 1 | 1 | 0 | 0 | 0 | 0 | 1 |
| 0 | 0 | 0 | 1 | 0 | 0 | 0 | 1 |
| 0 | 0 | 1 | 1 | −X | 1 | 0 | 1 |
| 0 | 1 | 0 | 1 | −X | 1 | 0 | 1 |
| 0 | 1 | 1 | 1 | −2X | 0 | 1 | 1 |
| 1 | 0 | 0 | 1 | 2X | 0 | 1 | 0 |
| 1 | 0 | 1 | 1 | X | 1 | 0 | 0 |
| 1 | 1 | 0 | 1 | X | 1 | 0 | 0 |
| 1 | 1 | 1 | 1 | 0 | 0 | 0 | 0 |

The format of the table is the same as that of table 2 with the first part of the table representing the Booth coding values for a accumulate function. The values for CX, C2X and SGN are conventional. The second half of the table represents the Booth coding values where a subtract function is to be carried out. If a multiply accumulate function is to be carried out, P is calculated by the multiplier and MUL_SUB is equal to "0". For a multiply subtract function, −P is calculated by the multiplier and MUL_SUB is equal to "1".

As can be seen, the value of CX' is the same as regardless of whether or not an accumulate or subtract function is to be performed. Likewise, the C2X' value is also the same, regardless of whether or not an accumulate or subtract function is to be performed. The SGN values, for given values of the three bits of the multiplier i.e. Y are the inverse for a subtract function as compared to for an accumulate function.

Figure 6:
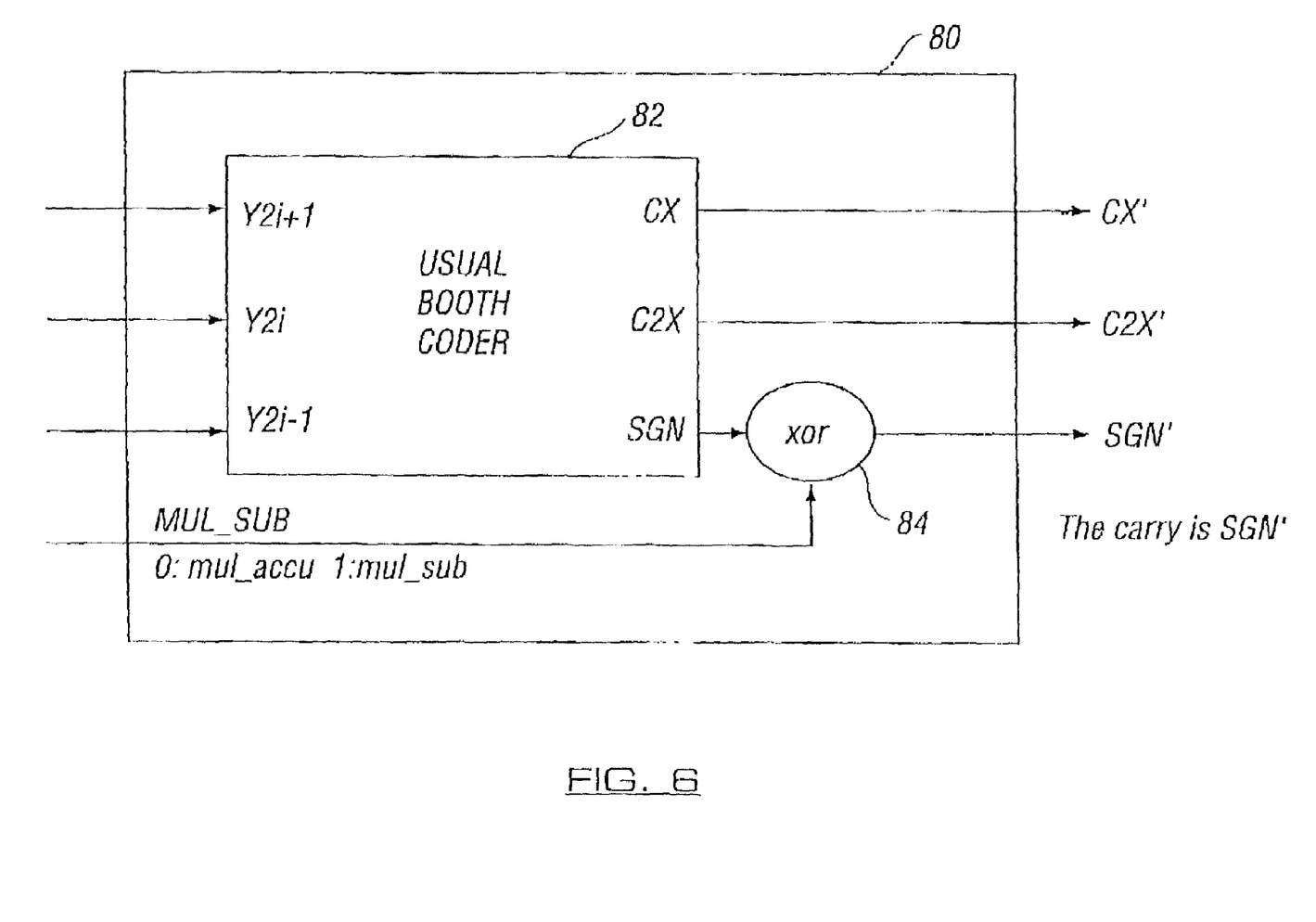
FIG. 6 shows a second Booth coder embodying the present invention.

Reference is now made to FIG. 6 which shows a modified Booth coder 80 for use with CX-C2X-SGN coding. The modified Booth coder 80 comprise: a conventional Booth coder 82 which receives the Y2i+1, Y2i and Y2i−1 inputs, as is known. The conventional CX, C2X and SGN outputs are provided by the conventional Booth coder 82. The SGN output of the conventional Booth coder 82 is input to an exclusive OR gate 84. The exclusive OR gate 84 receives the input value of "0" if an accumulate function is to be carried out and the value "1" if a subtract function is to be carried out. If the exclusive OR gate 84 receives a "0" value, the SGN output of the conventional Booth coder 82 is not modified. If, however, the exclusive OR gate receives a "1" value, then the value of SGN from the conventional Booth coder 82 is inverted.

The outputs CX and C2X of the normal Booth coder 82 provide the outputs CX' and C2X' of the modified Booth coder. The output of the exclusive OR gate 84 provides the SGN' output of the modified Booth coder.

This embodiment enables multiply subtract functions to be performed without taking any additional time as compared to the known arrangement for performing the multiply accumulate function. The SGN' control is generated by the XOR function between the signal SGN and the signal MUL_SUB. With reference to Table 1, it can be seen that SGN=Y2i+1, so SGN'=(Y2i−1) XOR MUL_SUB. It can also be seen that CX=Y2i XOR (Y2i−1). CX=CX' in this embodiment. Thus CX' and SGN' are both generated by an XOR function between two primary inputs. They are generated at the same time. Accordingly, the multiply subtract function does not require any additional time.

In both of the above described modifications, the carry i.e. +1 of the expression $-Y=\bar{Y}+1$ has to be taken into account. In both embodiments, this is taken into account in the Booth coding of the first partial product P0. This partial product is centred on bit Y0. The three bits are therefore Y1, Y0 and Y−1. Y−1 is assumed to have the value "0". As this bit is "0" only half of the possible values of the triplet can occur.

Table 4 below shows the possible values where N=0.

| Y1 | Y0 | Partial product for Y1:Y0 | $\bar{Y1}$ | $\bar{Y0}$ | $\overline{Y-1}$ (= '0') | Partial product for $\overline{Y1:Y0}$ | Partial product taking the carry into account |
|---|---|---|---|---|---|---|---|
| 0 | 0 | 0 | 1 | 1 | 0 | −X | 0 |
| 0 | 1 | X | 1 | 0 | 0 | −2X | −X |
| 1 | 0 | −2X | 0 | 1 | 0 | X | 2X |
| 1 | 1 | −X | 0 | 0 | 0 | 0 | X |

When calculating −P, $\bar{Y1}$, $\bar{Y0}$ and the carry need to be taken into account. The table above shows the partial product for $\bar{Y1}$ and $\bar{Y0}$ with $\overline{Y-1}$ being 0. The final column shows partial product that has to be generated when taking into account bits Y1 and Y0 and also the carry. Taking the carry into account (value: +1) means adding 1*X to the partial products of the previous column.

It can be seen from the above table that when calculating −P, the first partial product P0 is opposite of the partial product which is generated when calculating P0 for a multiply accumulate function.

Accordingly, the carry can be taken into account using the same mechanism as described hereinbefore for the other partial products. In other words NZN and NZP are exchanged for SNGL-NZP-NZN coding and SGN is inverted for CX-C2X-SGN coding.

Figure 7:
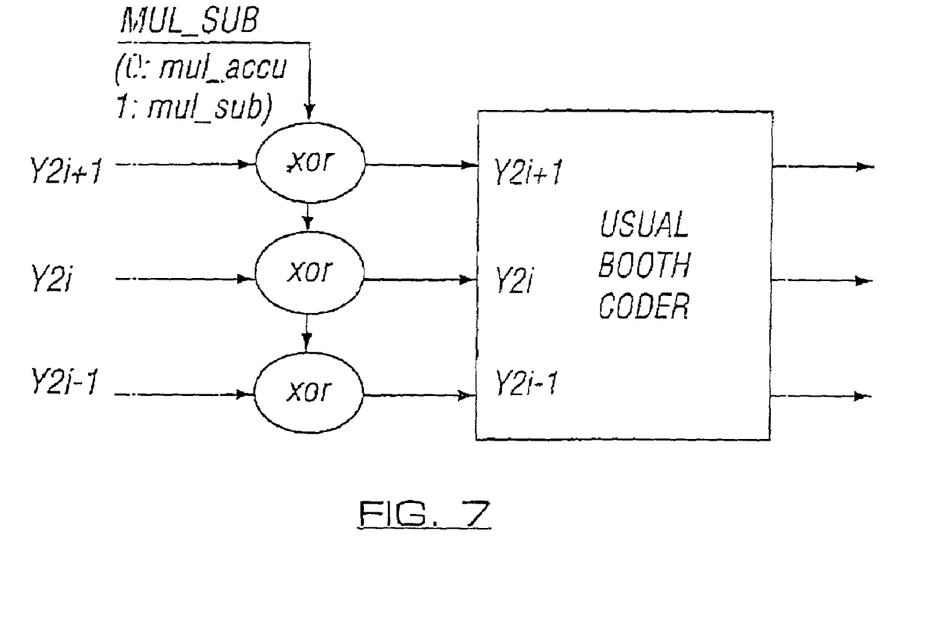
FIGS. 7 and 8 show a further embodiment of the present invention.
Figure 8:
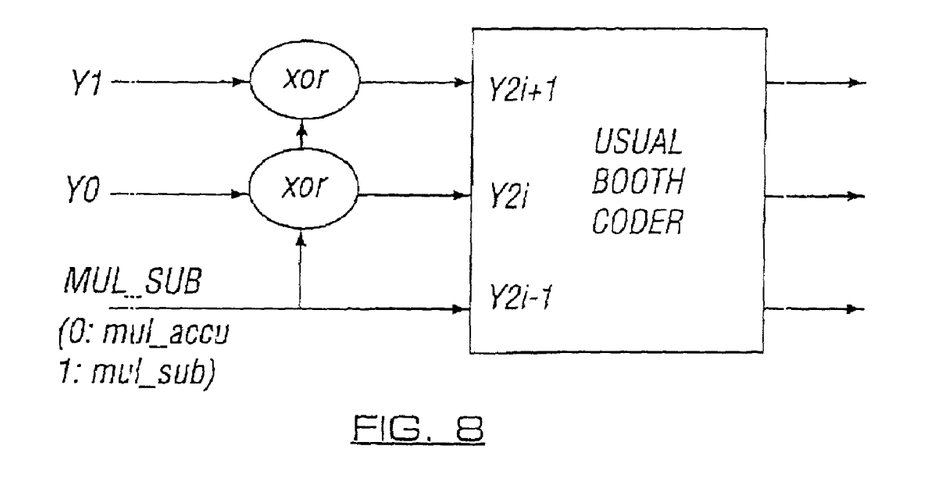

Reference is made to FIGS. 7 and 8 which shows an alternative embodiment of the present invention. In this embodiment the input to the Booth coder is modified instead of the output. Firstly, Y is modified if it is necessary. When −P is required, Y is modified to $-Y=\bar{Y}+1$. This modified value is then input to the Booth coders. The carry (+1) is also taken into account when −Y is used instead of Y. Input Y2i−1 of the Booth coder which receives Y1 and Y0 receives the carry. In this embodiment there are no cells between the Booth coder and decoder. Rather XOR gates are provided on each of the inputs to the Booth coder. The XOR gates provide an XOR function between Yi and MUL_SUB. The XOR gates generate Yi when MUL_SUB is "0". When MUL_SUB is "1", the XOR gates generate $\bar{Y}i$. By modifying the inputs to the Booth coder, the correct output is obtained for the input values for both the multiply accumulate and the multiply subtract functions.

FIG. 8 shows the booth coder which deals with the carry. When MUL_SUB is 1, then −Y is used, and the carry (+1) has to be taken into account. When MUL_SUB is 0, Y is used, and no carry has to be used (carry=0). In fact, MUL_SUB equals the carry. Then it is this signal which is input on input Y2i−1 of the Booth coder receiving Y1 and Y0. Y1 is connected to the 2N+1 input and Y0 is connected to the 2N input. In an accumulate function input Y2i−1 is fed to '0'. XOR gates are provided on the other two inputs which perform an XOR function between MUL_SUB and Y0, and MUL_SUB and Y1 respectively.

It should be appreciated that Booth Coders having more or less than three inputs may be used in alternative embodiments of the present invention. It should also be appreciated that any suitable number of Booth coders may be provided although in preferred embodiments of the present invention the number of Booth coders may be roughly half the number of bits in the multiplier Y. The number of Booth decoders may be roughly equal to the number of bits of the multiplicand X.

In the embodiments described hereinbefore, XOR gates have been used. These gates can be replaced by an exclusive NOR gate or any other suitable logic. The values of some signals may need to be inverted.

Embodiments of the present invention are particularly applicable to digital signal processors and can be incorporated in integrated circuits.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An arithmetic unit for multiplying a first quantity X by a second quantity Y, said arithmetic unit comprising:
   a Booth coder having a plurality of inputs for receiving a plurality of bits of the second quantity and a plurality of outputs for providing Booth coded outputs;
   circuitry connected to either at least one of said inputs for receiving one of said plurality of bits of the second quantity or to said outputs for providing Booth coded outputs;
   said circuitry comprising a further input to receive a signal indicating if a multiply accumulate or multiply subtract function is to be performed, said circuitry arranged to modify at least one output of the coder if necessary in accordance with said signal, whereby the output of said Booth coder unit is a Booth coded signal modified if necessary to take into account the function to be performed wherein said coder is arranged to provide a SNGL output, an NZP output and an NZN output;
   wherein said unit is capable of performing the calculations X multiplied by Y and X multiplied by Y, the output of the Booth coder being the same for both of said calculations; and
   a Booth decoder arranged to separate a partial product from said Booth coded signal and said first quantity.

2. A unit as claimed in claim 1, wherein the Booth Coder comprises three inputs.

3. A unit as claimed in claim 1, wherein the Booth coder provides three outputs.

4. A unit as claimed in claim, 1 wherein said circuitry comprises a logic gate.

5. A unit as claimed in claim 4, wherein said logic gate is an exclusive OR gate.

6. A unit as claimed in claim 1, wherein said circuitry comprises at least one multiplexer.

7. A unit as claimed in claim 6, wherein said NZP and said NZN outputs are connected to said circuitry.

8. A unit as claimed in claim 7, wherein said NZP output is connected to a first and a second multiplexer and said NZN output is also connected to said first and second multiplexers.

9. A unit as claimed in claim 8, wherein a partial product is to be output, the first multiplexer provides the NZP output and the second multiplexer provides the NZN output and when the partial product of the opposite sign is to be generated, the first multiplexer provides the NZN output and the second multiplexer provides the NZP output.

10. A unit as claimed in claim 9, wherein x is equal to two and the N most significant bits or the N least significant bits are used in said multiplication and said circuitry receives at least one control signal to control the selection of the N bits, three multiplexers are provided, the first and second multiplexers each receive the NZP and NZN outputs of first and second Booth coders and the third multiplexer receives the SNGL outputs of first and second Booth coders.

11. A unit as claimed in claim 1, wherein said second quantity is a xN bit operand where x is an integer and N bits are used for multiplication with the first quantity, xN/2 Booth coders are provided and said circuitry is connected to inputs or outputs of said xN/2 Booth coders.

12. A unit as claimed in claim 11, wherein x is equal to two and the N most significant bits or the N least significant bits are used in said multiplication and said circuitry receives at least one control signal to control the selection of the N bits.

13. A unit as claimed in claim 1, wherein said circuitry is connected to at least two of said inputs.

14. A unit as claimed in claim 1, wherein one of said inputs for receiving a one of said plurality of bits of the second quantity to said Booth coder is a carry input.

15. A unit as claimed in claim 1, wherein said circuitry is arranged to receive a carry input.

16. A unit as claimed in claim 1, wherein said unit is arranged to provide a multiply accumulate or a multiply subtract function, said circuitry causing the partial product to be provided if the multiply accumulate function is to be provided and the partial product of the opposite sign if the multiply subtract function is to be provided.

17. A unit as claimed in claim 16, wherein a plurality of Booth coders are provided, one of said Booth coders being arranged to take into account a carry.

18. A unit as claimed in claim 17 wherein when a multiply subtract function is performed, the first value and the opposite of the second value are multiplied, where if the second value is Y, the opposite value is y+1, and +1 is the carry.

19. A unit as claimed in claim 16, wherein the output provided by said circuitry is arranged to provide an output which takes into account said carry, if required.

20. A unit as claimed in claim 1, wherein said circuitry is arranged to receive a control signal.

21. A unit as claimed in claim 1, wherein the modified output of said coder is decodable to a partial product opposite to the partial product decoded from the output prior to modification.

* * * * *

UNITED STATES PATENT AND TRADEMARK OFFICE
CERTIFICATE OF CORRECTION

| | | |
|---|---|---|
| PATENT NO. | : 7,096,246 B2 | Page 1 of 1 |
| APPLICATION NO. | : 09/919496 | |
| DATED | : August 22, 2006 | |
| INVENTOR(S) | : Sebastien Ferroussat | |

It is certified that error appears in the above-identified patent and that said Letters Patent is hereby corrected as shown below:

On the title page: Item (75) should read:
Item (75) Inventor: Sebastien Ferroussat, Anberieu en Rue, (FR)

Item (30) Foreign Application Priority Data should read:
Aug. 1, 2000  (EP)  …………………...........00410090

Signed and Sealed this

Fourteenth Day of November, 2006

JON W. DUDAS
*Director of the United States Patent and Trademark Office*